US006827277B2

(12) United States Patent
Bloomberg et al.

(10) Patent No.: US 6,827,277 B2
(45) Date of Patent: Dec. 7, 2004

(54) USE OF PEARLESCENT AND OTHER PIGMENTS TO CREATE A SECURITY DOCUMENT

(75) Inventors: Bentley Bloomberg, Maynard, MA (US); Robert L. Jones, Andover, MA (US)

(73) Assignee: Digimarc Corporation, Tualatin, OR (US)

(*) Notice: Subject to any disclaimer, the term of this patent is extended or adjusted under 35 U.S.C. 154(b) by 141 days.

(21) Appl. No.: 09/969,200

(22) Filed: Oct. 2, 2001

(65) Prior Publication Data

US 2003/0062421 A1 Apr. 3, 2003

(51) Int. Cl.[7] .......... G06K 19/06
(52) U.S. Cl. .......... 235/491; 235/468
(58) Field of Search .......... 235/468, 491

(56) References Cited

U.S. PATENT DOCUMENTS

| | | | | | |
|---|---|---|---|---|---|
| 3,949,501 | A | | 4/1976 | Andrews et al. | 40/2.2 |
| 4,155,618 | A | | 5/1979 | Regnault et al. | 339/145 R |
| 4,415,225 | A | | 11/1983 | Benton et al. | 350/3.84 |
| 4,663,518 | A | | 5/1987 | Borror et al. | 235/487 |
| 4,765,656 | A | * | 8/1988 | Becker et al. | 283/70 |
| 4,773,677 | A | | 9/1988 | Plasse | 283/77 |
| 5,005,873 | A | * | 4/1991 | West | 283/92 |
| 5,066,947 | A | | 11/1991 | DuCastel | 340/815.31 |
| 5,087,507 | A | * | 2/1992 | Heinzer | 428/195 |
| 5,304,789 | A | * | 4/1994 | Lob et al. | 235/487 |
| 5,458,713 | A | * | 10/1995 | Ojster | 156/234 |
| 5,824,447 | A | * | 10/1998 | Tavernier et al. | 430/124 |
| 6,146,741 | A | * | 11/2000 | Ogawa et al. | 428/195 |
| 6,183,018 | B1 | * | 2/2001 | Braun et al. | 283/114 |
| 6,284,337 | B1 | * | 9/2001 | Lorimor et al. | 428/40.1 |
| 6,474,695 | B1 | * | 11/2002 | Schneider et al. | 283/72 |

OTHER PUBLICATIONS

PCT Document, "Notification of Transmittal of the International Search Report or the Declaration".
PCT Document, "International Search Report".

* cited by examiner

*Primary Examiner*—Mark Tremblay
(74) *Attorney, Agent, or Firm*—Digimarc Corporation

(57) ABSTRACT

A security instrument and method of forming the same, in which the instrument is comprised of a series of layers which overlay one another, and in which at least one of the layers has a pattern imprinted thereon in a predetermined location, with pearlescent materials of varying colors and hues. When the layers are bonded together on a base member, a design emerges at the surface that provides optical variations, depending on the attitude and lighting at which the instrument is viewed.

58 Claims, 2 Drawing Sheets

USE OF PEARLESCENT AND OTHER PIGMENTS TO CREATE A SECURITY DOCUMENT

The present invention relates to security documents, e.g., credit cards, identification badges and the like and, more particularly, to the use of pearlescent and other materials, such as, ultra violet sensitive, or infrared sensitive elements with the pearlescent, in a predetermined design which can be read only under specified conditions and are extremely difficult to replicate, thereby creating a reliably secure instrument.

BACKGROUND

As the world moves relentlessly toward a cashless society, the venerable credit card has become a staple. So, too, in the corporate arena, where secret modes or methods are closely guarded and industrial espionage is seemingly on the rise, the ability to identify authorized personnel and distinguish them from interlopers has become an art form.

The foregoing examples are but two among a myriad of circumstances which call for the implementation of a system of secure identification by means of cards and badges. Drivers licenses, which are no longer simply evidence of payment of a fee, but have become a primary means of personal identification, are yet another category of use for secure instruments. The credit card issuers seem to be in competition to create the most decorative, yet secure instruments, and consumers seem to be attracted to issuers who provide more than just low introductory interest. The security instrument industry seems to have taken on a life of its own and considerable research is being conducted into ways of producing an aesthetically pleasing identification card, or badge, which is incapable of being counterfeited and will destruct upon attempted alteration. The counterfeiting of identification documents involving as it does the alteration, fabrication, issuance and ultimately, use of such cards by persons not authorized to do so presents continual, and multiple security problems for legitimate issuers.

Perhaps the most effective, yet impractical, way to prevent counterfeiting would involve strict control over the possession of the materials and equipment involved in the fabrication of identification documents. For example, too many of the materials involved are commercially available and used in other, less sensitive, applications. To date, the more popular response to the counterfeiting problem involves the integration of several verification features to evidence authenticity. The best known of these "verification features" involve signatures such as the signature of the one authorized to issue the document, or the signature of the bearer. Other popular verification features have involved the use of watermarks, fluorescent materials, validation patterns or markings and polarizing stripes. These verification features and perhaps others, are integrated in various ways and may provide visual verification, or in some instances, invisible evidence of authenticity, in the finished card. If invisible, of course, authenticity is verifiable by viewing the instrument under conditions that render the invisible feature, visible.

The present invention is operative within this broad field, to teach a novel printing process using multiple colors to provide an interlocking design which is capable of producing an optically variable visual image, resulting in an instrument with enhanced security.

Overview of the Prior Art

From a meager beginning with a card having minimal identifying information imprinted on it, identification documents have progressed to ones which include a picture of the authorized person, such as, e.g., Andrews U.S. Pat. No. 3,949,501, wherein a photograph is laminated into a card having printed information accompanying the photograph. A later issued U.S. Pat. No. 4,155,618, discloses the kind of sheet material that might be used in such a laminate. Magnetic coding may also be added to the card as taught in Andrews et al. U.S. Pat. No. 3,949,501. In Plasse U.S. Pat. No. 4,773,677, a layer of material is added to the laminate upon which an insignia is embossed.

Expanding on the concept of embossing an insignia into the identification card and as a means of making duplication and/or alteration more difficult, use of a hologram became an option. Mailloux et al. U.S. Pat. No. 5,066,047 is representative.

In instances where security is a principal objective and counterfeiting of security documents provides a perceptible advantage to the counterfeiter and is, therefore, likely to occur, the use of holograms has become an effective means of thwarting counterfeiting efforts. Benton et al. U.S. Pat. No. 4,415,225 teaches at least one means of creating a holographic image. The hologram, by virtue of its capacity to convey varying visual imagery as the hologram is observed from various positions, makes the overall effect very difficult to replicate and, thus, rather ideal as an anti counterfeiting device. The process of creating holographic images is somewhat complex and requires equipment that is not readily available at one's office supply store. Research is ongoing, therefore, to find a way of creating a holographic effect without the necessity of forming a holographic image.

All of the verification features discussed above have achieved a measure of success in preventing or discouraging counterfeiting. Duplication of these feature(s), either singularly, or in combination, typically presents a sufficient obstacle of sufficient difficulty to discourage the average would-be-counterfeiter. However, to the ingenious and/or particularly motivated, at least some features are considered to be merely a challenge, thus creating a continuing need for more and better solutions. The present invention is addressed to that need.

SUMMARY OF THE INVENTION

With the foregoing as a basis for establishing the environment within which the present invention has particular, although not exclusive, utility, and incorporates, in a single security instrument, multiple pearlescent colors in an interlocking design producing an optical variable visual effect, that provides a novel verification feature which more closely approaches an idealized performance characteristic which is the goal of all such features.

It is, accordingly, an objective of the present invention to provide a security document which embodies many of the salutary security benefits of a holographic image without actually creating such an image. An objective closely related to the foregoing is to teach a method of creating such a security document.

Another objective of the present invention is to provide the industry with a security instrument in the form of a card, or badge, which includes an iridescence, which when viewed in various lights at various tilts and angles, gives an optically variable appearance which, when done rapidly, creates a sense of movement and is, thus, difficult in the extreme to reproduce.

A further objective of the present invention is to create a security instrument, having at least one design depicted in an iridescent color and which has a laminated structure in which various pearlescents are employed to create a design which, when viewed from different angles, may create uniquely individual two or three dimensional visual impression, which readily identifies the carrier and which is very difficult to replicate.

Another, and still further objective is to provide one or more pearlescent materials in which an additional material is capable of being added, which additional material is invisible to the naked eye, yet visible under specialized conditions, thereby providing yet another, and higher level of security.

The foregoing, as well as other objects and advantages of the present invention, will become apparent from a reading of the Detailed Description of a Preferred Embodiment, taken in conjunction with the drawings, wherein:

DETAILED DESCRIPTION OF A PREFERRED EMBODIMENT

Figure 1:
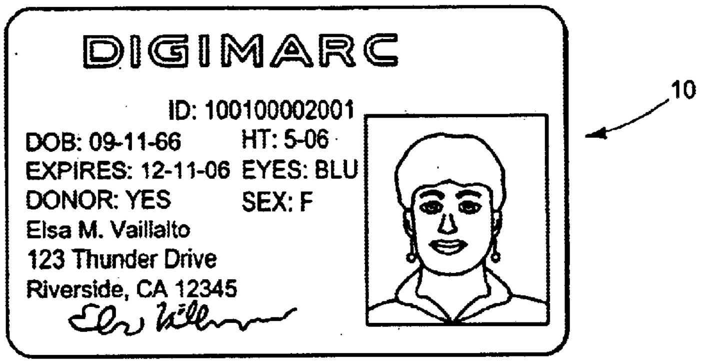
FIG. 1 is a pictorial representation of a security instrument, illustrating its overall appearance to the naked eye.
Figure 2:
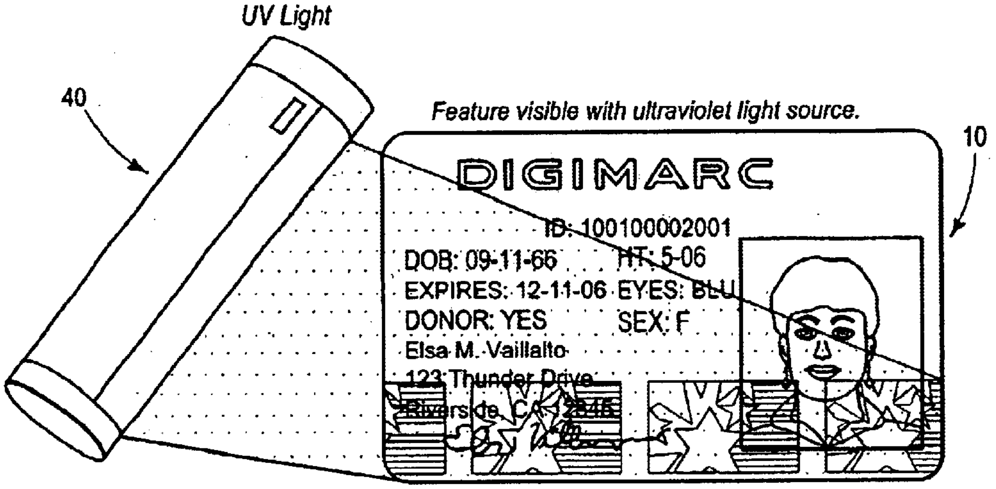
FIG. 2 is a view in the nature of FIG. 1, but illustrating how the security instrument would appear in the presence of ultraviolet light.

With reference now to the drawings, and initially to FIG. 1, a security instrument 10, constructed in accordance with the present invention, is there illustrated pictorially. The instrument, as illustrated, is in the nature of a printable card, although other instruments having the requisite characteristics are within the contemplation of the teachings to follow. The security instrument 10, in its exemplary form, has a rectangular shape and having both printed data, shown at 12, which might include a name, address, and perhaps a picture 14, along with identifying information which might be directly shown, or encoded, and might include, e.g., a social security number or in house identification number which is meaningful only to the card issuer. A data strip may also be provided, although not shown, without departure from the invention.

Various designs to be embodied in the instrument 10 are within the contemplation of the invention and might, for example, include the logo of the issuer, as well as any number of other designs which would be indigenous to the issuer or the issuer's business, or related characteristics. At least one such design, in keeping with the invention, is intended to substantially defy replication, or alteration, and is the product of a plurality of materials, including pearlescents, having been applied in a predetermined pattern, or relationship, to one of various laminates which are overlaid and bonded with one another to create the instrument 10.

In keeping with the invention, the pattern is integrated with a bond or seal existing between a protective cover sheet or film and the information-bearing surface of the card or document. The light-reflective materials contemplated by the present invention are preferably known products of commerce and include materials and/or pigments consisting of flat irregularly shaped mica platelets coated with titanium dioxide and/or iron oxide. The carrier may be colored with other compatible transparent materials and/or dyestuffs to produce a resultant color that will produce the desired effect and be compatible with the background. The textural quality of the pearl finish is adjustable through alteration of the particle sizes—fine particles produce a satin effect while large particles yield a glitter or sparkle effect. More precisely, light-reflective materials of the type described above which are particularly suitable for use in the present invention are those materials having an average particle size between 0 and 50 microns. For the purposes of this invention, "average particle size" means that the major portion of the material has a particle size between about 1 to about 25 microns although smaller portions of larger or smaller particles can be present.

Patterns comprising light-reflective materials of the above discussed characteristics are distinctive in that the pattern is visible or discernable at least on close examination of the finished document but the pattern does not effectively obscure document information covered by the pattern. Thus, when the laminates are bonded, or otherwise secured together, the user will be able to discern, looking upon the card, an iridescent design. Moreover, it is an added feature of this construction that as the instrument is tilted and rotated, the design appears to come to life, resulting in a variable and optically active appearance.

Figure 3:
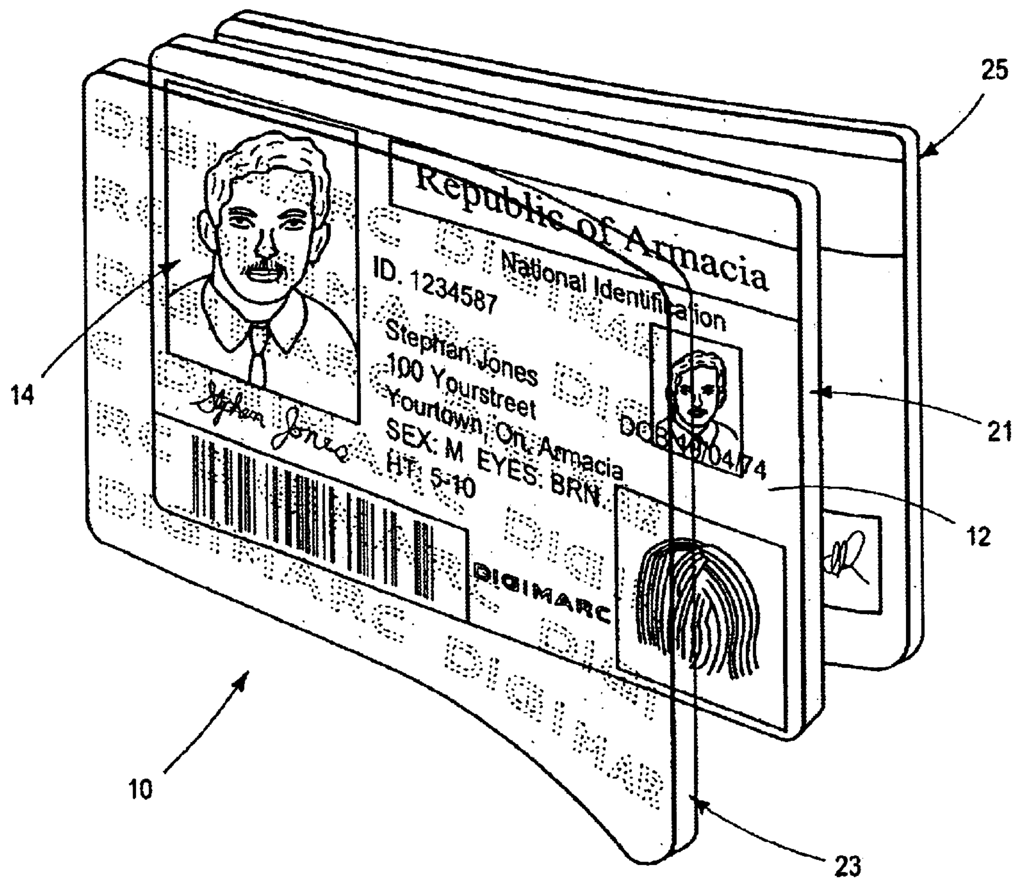
FIG. 3 is a perspective representation of a typical security instrument, illustrating a laminate structure and the application of materials to one or more layers of said laminate.

With special attention now to FIG. 3, a security instrument 10 constructed in accordance with the present invention comprises a base, or support substratum member 21. The base member is preferably of a plastic material, formed into a sheet and cut to size. The base member tends to be stiff, as distinguished from the laminates that are bonded to it, in order to provide some stability and durability to the instrument 10. Further, the substratum may be printed, or embossed, or otherwise impressed with printed data, which, by virtue of the transparency of the overlaying layers, is visible therethrough.

Construction of the security instrument 10 is completed by the addition, for example, of a series of laminates 23 and 25. More or less laminates may be employed without departure from the invention. The laminates are formed of a translucent, thin, flexible plastic film, of which Teslin® is particularly suitable, although other materials displaying the desired characteristics may be used without departure from the invention.

It has been determined that the integrity of the colors to be used are, in some measure, affected by the color or hue of the TESLIN®, or other suitable material, it appearing that such materials demonstrate some variation in their color, while remaining essentially translucent. Thus, car must be taken in the selection of the material that demonstrates a background color that will compliment the materials and/or pigments to be used in forming the requisite pattern. While the process may be somewhat arduous, the result is that the materials to be printed thereon will demonstrate the optimum color saturation and provide the desired optical variation when viewed in various attitudes.

The process employed to actually impress the material of the selected laminate may vary among methods familiar in the art, for printing these materials on a plastic surface, including use of a printer having engraved cylinders, and, perhaps, use of certain silk screen techniques.

Further in keeping with the invention, selected dyes, or pigments, are used to create an optically active design, which has an appearance which varies with the character and temperature of the light and/or the angle at which the instrument 10 is viewed. To this end, pearlescent colors are selected, which may be primary colors; e.g., blue, red and green may be employed, among others. Once the design is chosen, the colors selected to make up the design are oriented for imprinting on the selected laminate to create the desired appearance at the surface of the instrument.

It will be appreciated that selection of the appropriate colors, material, and/or pigments may be important, and appropriate materials are known to be available from EM Industries, which is part of EMD Chemicals, Inc., Gibbtown, N.J. under the trademark AFFLAIR, and from Mearl, under the name Duochrome.

Thus, and in specific reference to the drawings, the laminate 23 may, for example, be printed with the selected pearlescent on one or more layers The structure may be merely one layer, or may be comprised of multiple layers.

Once the laminate is imprinted, the instrument 10 is formed by the adherence, such as by bonding together of the laminates, such as by use of, for example, a D&K lamination device, thus completing the instrument. It is within the purview of the invention to create a comparable instrument through the use of non-visible materials, intermixed with materials within the visible spectrum, which are responsive to a light source having particular wave length, not normally visible with the naked eye.

For example, there are imprintable dyes, pigments or materials which as part of formulation, are responsive only to very short wave lengths in the ultra violet range and others which respond only to much longer wave lengths in the infrared range. While such materials are essentially invisible to the human eye in normal lighting circumstances, and even though they may have a hue or tint inherent in them, by using a detection device 40, such as for example, a light source emitting a predetermined wave length, a pattern or design of a certain color is readily discerned. For example, an ultraviolet color may contain any of the primary colors or variations thereof.

Accordingly, an instrument is created which has particularly attractive security characteristics in that there is no overt evidence of a security message or design to the naked eye, but when presented in the appropriate environment, the secure nature of the instrument becomes evident and exceedingly difficult to tamper with or replicate.

Yet another alternative is available in the practice of the invention. Special materials are available and may be created by mixing pearlescents with material's having ultra violet or infrared properties. For example, a clear resin forming a base for the contemplated composite is, in keeping with this aspect of the invention, saturated with 0% to 50%, preferably 10%–30%, by weight, of pearlescent. To that admixture, a measured quantity of ultra violet or infrared material, for example, such as dye or pigment, having a selected hue or tint, is added, representing between 0% to 20% by weight, in a preferred embodiment between 2%–5%, of the composite.

The resultant composite can be formed by use of a variety of pearlescents to provide a particular pattern, or design, which would be visible to the naked eye. The mixture that includes wavelength sensitive pigments or materials, visible only through the use of a detecting device, also presents the same appearance in the presence of such a detecting device. Clearly, the resultant instrument is particularly beneficial in enhanced security environments and very difficult to replicate; yet any effort to tamper with the instrument would be immediately obvious.

Finally, it is within the contemplation of the invention that both ultra violet and infrared materials, having a variety of colors, could be combined in the composite, further expanding the options to the issuer in terms of enhancing security and determining breaches thereof.

The integration of the previously described novel verification feature of the present invention with known adhesive systems provides a security instrument having special advantages. For example, under normal circumstances, it would be very difficult to remove a cover laminate from the printed laminate without disturbing the materials impressed thereon, thereby maintaining the interlocking pattern of light-reflective material undisturbed. Moreover, in the unlikely event that a cover laminate is removed with the pattern intact, at least some portions of the information-bearing surface of the print would expect to be adhered to the adhesive of the cover laminate. Any attempt to separate previously adhered laminates may expect to destroy or at least distort information-bearing surface, making such efforts immediately apparent.

In addition to protection from manual or mechanical intrusion, the printing process, using interlocking multi colored light reflective materials also provides protection against counterfeiting by photo copying. Protection against photo copying results from the failure of a copy to function. Protection from counterfeiting is provided by the requirement for special knowledge and special equipment and processes to duplicate the process. From the foregoing, it should be appreciated that the improved of the present invention provide a distinctive and effective verification feature that can be integrated with the documents in a relatively simple, inexpensive and convenient fashion. On the other hand, the instrument is sufficiently sophisticated to require specialized considerations and a concerted effort on the part of a would-be-counterfeiter to defeat or duplicate it.

It will now be appreciated that a security instrument constructed in accordance with the present invention is created by first forming a base member which defines the metes and bounds of the instrument and, after printing at least one layer of the instrument with pearlescent materials a design emerges at the surface of the completed instrument which is optically variable, i.e., the visual impression varies depending on the attitude of the card relative to the viewer and depending to some extent on the type and angle of the light in which it is viewed. Further, the design conveys a sense of depth to the viewer, giving dimension to the design, making it difficult, if not impossible, to replicate.

Having thus described a preferred embodiment of the present invention and certain variations on the main theme, it will be appreciated that certain modifications may be made without departure from that theme, and what is claimed, therefore, is:

What is claimed is:

1. A security instrument comprising:

a plurality of layers, one of said plurality of layers being a base member;

a plurality of materials being used for printing on one of said plurality of layers, wherein one of said plurality of materials comprises a pearlescent material;

said plurality of materials being applied in a predetermined relationship at selected locations on at least one of said plurality of layers so as to define a pattern, wherein the pattern comprises the pearlescent material and a design in which two differently colored materials are interlocked to define a visually active design that conveys a varying visual image depending on the attitude of the security instrument relative to the viewer and permits printed information that is overlaid by the pattern to be effectively perceived.

2. The security instrument of claim 1, wherein one of said plurality of layers comprises a laminate layer printed with a preselected interlocking multi-colored design in a particular location thereon; and said laminate layer being overlaid and bonded together with said base member to form said security instrument; said laminate layer, when overlaid, defining a visually active design having the appearance of depth and conveying a varying visual image depending on the attitude of the card relative to the viewer.

3. The security instrument of claim 2, wherein said pattern has an appearance of depth.

4. The security instrument of claim 2, wherein said pattern comprises a gradient such that said pattern changes when viewed from differing angles.

5. The security instrument of claim 1, wherein at least on color of said two differently colored materials comprises a covert material that is invisible to the human eye.

6. The security instrument of claim 5, wherein said covert material comprises ultraviolet.

7. The security instrument of claim 6, wherein said ultraviolet material fluoresces one specific color.

8. The security instrument of claim 5, wherein said covert material comprises infrared.

9. The security instrument of claim 5, where is said covert material comprises a combination of both ultraviolet and infrared materials.

10. The security instrument of claim 1, wherein said laminate layer is bonded to said base member such that, when said laminate layer and said base member are separated, said pattern adheres partially to said laminate layer and partially to said base member, rendering said security instrument invalid.

11. The security instrument of claim 1, wherein one of said plurality of materials is sensitive to light that is outside the visual spectrum of the human eye.

12. The security instrument of claim 11, wherein said plurality of materials comprises a material which is sensitive to infrared light to thereby give said security instrument a distinct appearance in the presence of an infrared detection device.

13. The security instrument of claim 11, wherein said one of said plurality of materials comprises a material which is sensitive to ultra violet light to thereby give said security instrument a distinct appearance in the presence of an ultraviolet detection device.

14. The security instrument of claim 1, wherein said predetermined pattern comprises a gradient such that said pattern changes when viewed from differing angles.

15. The security instrument of claim 1, wherein said plurality of materials comprises at least one ultra violet sensitive material and at least one infrared material such said security instrument has a distinct appearance when viewed under an infrared and/or an ultraviolet detection device.

16. The security instrument of claim 1 wherein at least one of the two interlocking colored materials is a light reflective material.

17. The security instrument of claim 1 wherein the pattern further comprises a third colored material interlocked with the two differently colored materials, the third colored material having a color different than that of either of the two differently colored materials.

18. The security instrument of claim 1 wherein at least a portion of the pattern conveys information.

19. The security instrument of claim 1, wherein the pattern is capable of identifying the carrier of the security instrument.

20. The security instrument of claim 1, wherein the pattern has a predetermined design.

21. A method of fabricating a security instrument comprising:

providing a plurality of layers, one of said plurality of layers being a base member, providing a plurality of materials being used for printing on one of said plurality of layers, wherein one of said plurality of materials comprises a pearlescent material; and applying said plurality of materials at selected locations on at least one of said plurality of layers so as to define a pattern, wherein the pattern comprises the pearlescent material and a design in which two differently colored materials are interlocked to define a visually active design conveying a varying visual image depending on the attitude of the security instrument relative to the viewer and permitting printed information that is overlaid by the pattern to be effectively perceived.

22. The method of claim 21 further comprising applying to at least one location on the security instrument a pearlescent material comprising at least one substance responsive to at least one light wavelength in the spectrum of light wavelengths invisible to the naked human eye.

23. A security instrument, comprising:

a first layer;

a second layer operably coupled to the first layer; and a pearlescent material applied to at least one of the first and second layers, the pearlescent material defining a pattern comprising at least two different colors that are at least partially interlocked in the pattern, wherein the pattern permits printed information that is overlaid by the pattern to be effectively perceived.

24. The security instrument of claim 23 wherein the pearlescent material is applied to define a pattern having a varying appearance depending on the angle from which the security instrument is viewed.

25. The security instrument of claim 23 wherein the pearlescent material is applied to define a pattern having an appearance of depth.

26. The security instrument of claim 23 wherein the pearlescent material is applied to define a pattern that gives an appearance of movement when the security instrument is viewed as it is moved from a first angle to a second angle.

27. The security instrument of claim 23 wherein the pearlescent material is selected to define a pattern that has a varying appearance depending on the temperature of a light source that is illuminating the pattern.

28. The security instrument of claim 23 wherein at least a portion of the pattern is substantially visible to a human eye when the security instrument is viewed at a predetermined orientation.

29. The security instrument of claim 23 wherein at least a portion of the pattern is substantially invisible to a human eye when the security instrument is viewed at a predetermined orientation.

30. The security instrument of claim 29 wherein the portion of the pattern that is substantially invisible to a human eye is substantially visible to a human eye when the portion of the pattern is illuminated by a light having a predetermined wavelength in the spectrum of light wavelengths that are invisible to the human eye.

31. The security instrument of claim 30 wherein the predetermined wavelength comprises at least one wavelength in at least one of the infrared and ultraviolet ranges of light wavelengths.

32. The security instrument of claim 23 wherein the appearance of the pattern indicates whether the security instrument is valid.

33. The security instrument of claim 23 wherein the appearance of the interlocking of the at least two colors indicates whether the security instrument is valid.

34. The security instrument of claim 23 wherein at least a portion of the pearlescent material comprises a substance that is substantially invisible to the human eye unless the portion of the pearlescent material is illuminated by a light having a predetermined wavelength in the spectrum of light wavelengths that are invisible to the human eye.

35. The security instrument of claim 34 wherein the pearlescent material comprises 0 to 20% by weight of material responsive to at least one light wavelength in the spectrum of light wavelengths invisible to a naked human eye.

36. The security instrument of claim 34 wherein the pearlescent material comprises 2–5% by weight of material responsive to at least one light wavelength in the spectrum of light wavelengths invisible to a naked human eye.

37. The security instrument of claim 34 wherein at least a portion of the pearlescent material comprises material responsive to light in the ultra violet light range.

38. The security instrument of claim 34 wherein at least a portion of the pearlescent material comprises material responsive to light in the infrared light range.

39. The security instrument of claim 34 wherein at least a portion of the pearlescent material comprises material responsive to light in the ultraviolet light range and material responsive to light in the infrared light range.

40. The security instrument of claim 34 wherein the pearlescent material fluoresces at least one color.

41. The security instrument of claim 23 wherein at least one of the two colors further comprises a material that is substantially invisible to the human eye unless the at least one color is illuminated by a light having a predetermined wavelength in the spectrum of light wavelengths that are invisible to the human eye.

42. The security instrument of claim 23 wherein at least one of the first and second layers comprises information.

43. The security instrument of claim 23 wherein at least a portion of the pattern conveys information.

44. The security instrument of claim 23 wherein at least a first portion of the pearlescent material is applied to the first layer and a second portion of the pearlescent material is applied to the second layer.

45. The security instrument of claim 23 wherein at least a portion of the pearlescent material is at least partially disposed between first and second layers.

46. The security instrument of claim 23 further comprising a seal operably coupling together the first and second layers, wherein at least a portion of the pearlescent material is at least partially integrated with the seal.

47. The security instrument of claim 23 wherein at least one of the first and second layers comprises a color that combines with the pattern to define an optically variable image.

48. The security instrument of claim 23 wherein the second layer comprises a plurality of layers and wherein the pattern is formed by applying pearlescent material to at least two different layers in the plurality of layers.

49. The security instrument of claim 23 wherein at least one of the two colors comprises a primary color.

50. The security instrument of claim 23 wherein the pearlescent material comprises at least three different interlocked colors.

51. The security instrument of claim 23 wherein the pearlescent material comprises a light reflective material having an average particle size between 0 and 50 microns.

52. The security instrument of claim 23 wherein the pearlescent material comprises mica platelets coated with at least one of titanium dioxide and iron oxide.

53. The security instrument of claim 23 wherein the pearlescent material comprises 0 to 50% by weight of pearlescent pigment.

54. The security instrument of claim 23 wherein the pearlescent material comprises 10–30% by weight of pearlescent pigment.

55. The security instrument of claim 23, wherein the security instrument is an identification card.

56. The security instrument of claim 23, wherein the pattern is capable of identifying the carrier of the security instrument.

57. The security instrument of claim 23, wherein the pattern has a predetermined design.

58. A security instrument, comprising:

a base layer, a cover layer operably coupled in the base layer; and means for defining an optically variable pattern on the security instrument to provide an image having a holograph-like appearance but which does not require fabricating a hologram on the security instrument and wherein the optically variable pattern is constructed and arranged so that it is capable of at least partially overlaying information printed on the security instrument without effectively obscuring the overlaid printed information.

* * * * *